US009320064B2

(12) United States Patent  
Sarkar et al.

(10) Patent No.: US 9,320,064 B2  
(45) Date of Patent: Apr. 19, 2016

(54) SYSTEM AND METHOD FOR IMPROVING PDP CONTEXT ACTIVATION LATENCY (71) Applicant: Telefonaktiebolaget L M Ericsson (publ), Stockholm (SE)

(72) Inventors: Debasish Sarkar, Irvine, CA (US); Manmohan Munjal, Gurgaon (IN); Ayan Sen, Gurgaon (IN); Jaspal Singh, Gurgaon (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 14/224,890

(22) Filed: Mar. 25, 2014

(65) Prior Publication Data  
US 2015/0282162 A1    Oct. 1, 2015

(51) Int. Cl.  
*H04W 76/02* (2009.01)  
*H04W 88/12* (2009.01)

(52) U.S. Cl.  
CPC .............. *H04W 76/02* (2013.01); *H04W 88/12* (2013.01)

(58) Field of Classification Search  
None  
See application file for complete search history.

(56) References Cited

U.S. PATENT DOCUMENTS

| | | | | |
|---|---|---|---|---|
| 7,099,346 | B1 * | 8/2006 | Kanterakis | H04L 12/5693 370/329 |
| 2004/0037327 | A1 * | 2/2004 | Torsner | H04W 24/00 370/517 |
| 2005/0181782 | A1 * | 8/2005 | Hollis | H04L 29/06 455/424 |
| 2005/0239461 | A1 * | 10/2005 | Verma | H04L 29/06 455/435.1 |
| 2008/0037494 | A1 * | 2/2008 | Hietalahti | H04W 76/027 370/338 |
| 2009/0034496 | A1 * | 2/2009 | Ko | H04W 76/025 370/338 |
| 2011/0134770 | A1 * | 6/2011 | Lin | H04W 52/12 370/252 |
| 2011/0194433 | A1 * | 8/2011 | Song | H04W 76/046 370/252 |
| 2012/0057571 | A1 * | 3/2012 | Gerber | H04L 43/04 370/338 |
| 2012/0294236 | A1 * | 11/2012 | Watfa | H04W 60/04 370/328 |
| 2014/0064209 | A1 * | 3/2014 | Anchan | H04W 72/0406 370/329 |

FOREIGN PATENT DOCUMENTS

CA    WO 2010031031 A1 *    3/2010    ............ H04W 60/02

* cited by examiner

*Primary Examiner* — Joseph Bednash  
(74) *Attorney, Agent, or Firm* — Baker Botts, LLP (57) ABSTRACT

A radio network controller (RNC) receives a request to activate a packet data protocol (PDP) context for a wireless device operating in a forward access channel state. The RNC sends the request to activate PDP context to a core network node (CN). The RNC receives a request to assign a radio access bearer from the CN. The RNC sends a response to the request to assign a radio access bearer to the CN and initiates a timer. If the CN accepts the request to activate the PDP context prior to timer expiry, the RNC stops the timer and sends the wireless device the accept message followed by a request to reconfigure a radio bearer. Otherwise, if the timer expires, the RNC sends the wireless device the request to reconfigure the radio bearer followed by the accept message.

20 Claims, 9 Drawing Sheets

SYSTEM AND METHOD FOR IMPROVING PDP CONTEXT ACTIVATION LATENCY

TECHNICAL FIELD

Particular embodiments relate generally to wireless communications and more particularly to a system and method for improving PDP context activation latency.

BACKGROUND

In a wireless network, a wireless device may communicate with one or more radio access nodes to send and/or receive information, such as voice traffic, data traffic, control signals, and so on. In some cases, the wireless device may activate packet data protocol context as part of initiating a call. As an example, the wireless device may send an activate packet data protocol context request message to a radio network controller of a wireless network to initiate a call.

SUMMARY

According to some embodiments, a radio network controller receives a request to activate a packet data protocol context for a wireless device operating in a forward access channel state. The radio network controller sends the request to activate the packet data protocol context to a core network node. The radio network controller receives a request to assign a radio access bearer from the core network node. The radio network controller then sends the request to assign the radio access bearer to the wireless device via base station. A response to the request to assign the radio access bearer is received by the radio network controller from the wireless device via the base station. The radio network controller sends the response to the request to assign the radio access bearer to the core network node. After sending the response to the request to assign the radio access bearer to the core network node, the radio network controller initiates a timer.

According to one embodiment, the radio network controller determines that it did not receive an accept message corresponding to the request to activate the packet data protocol context from the core network node before the expiration of the timer. In response to the timer expiry, the radio network controller sends the wireless device a request to reconfigure a radio bearer via the base station. The radio network controller receives a radio bearer reconfiguration complete message from the wireless device via the base station. The radio network controller also receives the accept message from the core network node. The radio network controller determines that the accept message was not previously sent to the wireless device and sends the accept message to the wireless device via the base station.

According to another embodiment, the radio network controller determines that it did receive an accept message corresponding to the request to activate the packet data protocol context from the core network before expiration of the timer. In response to receiving the accept message, the radio network controller stops the timer and sends the accept message to the wireless device via the base station. After sending the accept message, the radio network controller sends the wireless device a request to reconfigure a radio bearer. The radio network controller receives a radio bearer reconfiguration complete message from the wireless device via the base station. In some embodiments, the radio network controller determines that the accept message was previously sent to the wireless device, and determines not to resend the accept message to the wireless device.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In wireless communication, Packet Data Protocol (PDP) Context Activation time may be an important metric for benchmarking, as Operator Networks may be ranked based on the latency of PDP Context Activation. Significant weight may be given to this metric, and any method to reduce this time may help customers achieve better network key performance indicators.

In existing systems, an Activate PDP Context Request is sent by a wireless device after sending a Radio Resource Control (RRC) Security Mode Complete message. The Activate PDP Context Request is considered as the starting point for calculating the PDP Context Activation time. Subsequently, an RRC Radio Bearer Setup Complete message is sent. If the session is being established for initial data download, an RRC Radio Bearer Reconfiguration process is initiated. If the call is being setup on Forward Access Channel (FACH) (e.g., rateSelectionPsInteractive.channelType= FACH), when a Radio Bearer Reconfiguration message is received (e.g., with primary scrambling code (PSC) equal to zero), a Cell Update Procedure starts. The Cell Update Procedure may be triggered because the RRC Radio Bearer Reconfiguration message indicates PSC equals zero, which is different from the current serving base station's PSC. The start of the Cell Update Procedure may delay sending of an Activate PDP Context Accept message by the radio network controller (RNC).

Typically, sending of the Activate PDP Context Accept message is considered the terminating point for calculating the PDP Context Activation time. Thus, if an Activate PDP Context Accept message is not received by the RNC before sending the Radio Bearer Reconfiguration message, the Cell Update Procedure will start and the Activate PDP Context Accept message over Downlink Direct Transfer can not be transmitted before the Cell Update Confirm Procedure is completed. Thus, under such circumstances PDP context activation time is undesirably extended.

The above problem is not encountered where the Activate PDP Context Accept Message is received by the wireless device before or at the same time as the RRC Radio Bearer Reconfiguration message. Under these circumstances, the delay associated with the Cell Update Procedure is avoided. Similarly, this problem is not encountered if the initial Packet Service (PS) Radio Access Bearer (RAB) Establishment happens in state Dedicated Channel (DCH) (e.g., rateSelectionPsInteractive.channelType=DCH). This is because, after sending the RRC Radio Bearer Reconfiguration message, there is no Cell Update Procedure and hence the Activate PDP Context Accept message can be transmitted in between without further delay.

As noted above, if initial call establishment happens in state FACH, there can be cases where PDP Context Activation Time is delayed due to a Cell Update Procedure happening after sending the RRC Radio Bearer Reconfiguration message but before transmitting the Activate PDP Context Accept message. Particular embodiments of the present disclosure may provide solutions to this and/or other problems. In certain embodiments, the delay caused by the cell update procedure can be avoided by not sending the RRC Radio Bearer Reconfiguration message before sending the Activate PDP Context Accept message to the wireless device. Although sending the RRC Radio Bearer Reconfiguration message after sending the Activate PDP Context Accept message is desirable, in order to prevent excessive time spent waiting for the Activate PDP Context Accept message to arrive at the radio network controller from the core network node, a user configurable timer may be employed. In certain embodiments, the timer may be initiated at the radio network controller after sending a response to a request to assign a radio access bearer to the core network. The timer may ensure that sending of the RRC Radio Bearer Reconfiguration message is not delayed beyond a certain point, thereby preventing undesirable delay in the overall call setup time.

In certain embodiments, if the timer expires before receiving the Activate PDP Context Accept message from the core network node, the radio network controller may send the RRC Radio Bearer Reconfiguration message to the wireless device. In certain embodiments, if the Activate PDP Context Accept message is received from the core network node before the timer expires, the timer may be stopped (and cleared), and the Activate PDP Context Accept message may be sent to the wireless device. Subsequently, the RRC Radio Bearer Reconfiguration message may be sent to the wireless device.

Particular embodiments are described in FIGS. 1-7 of the drawings, like numerals being used for like and corresponding parts of the various drawings.

Figure 1:
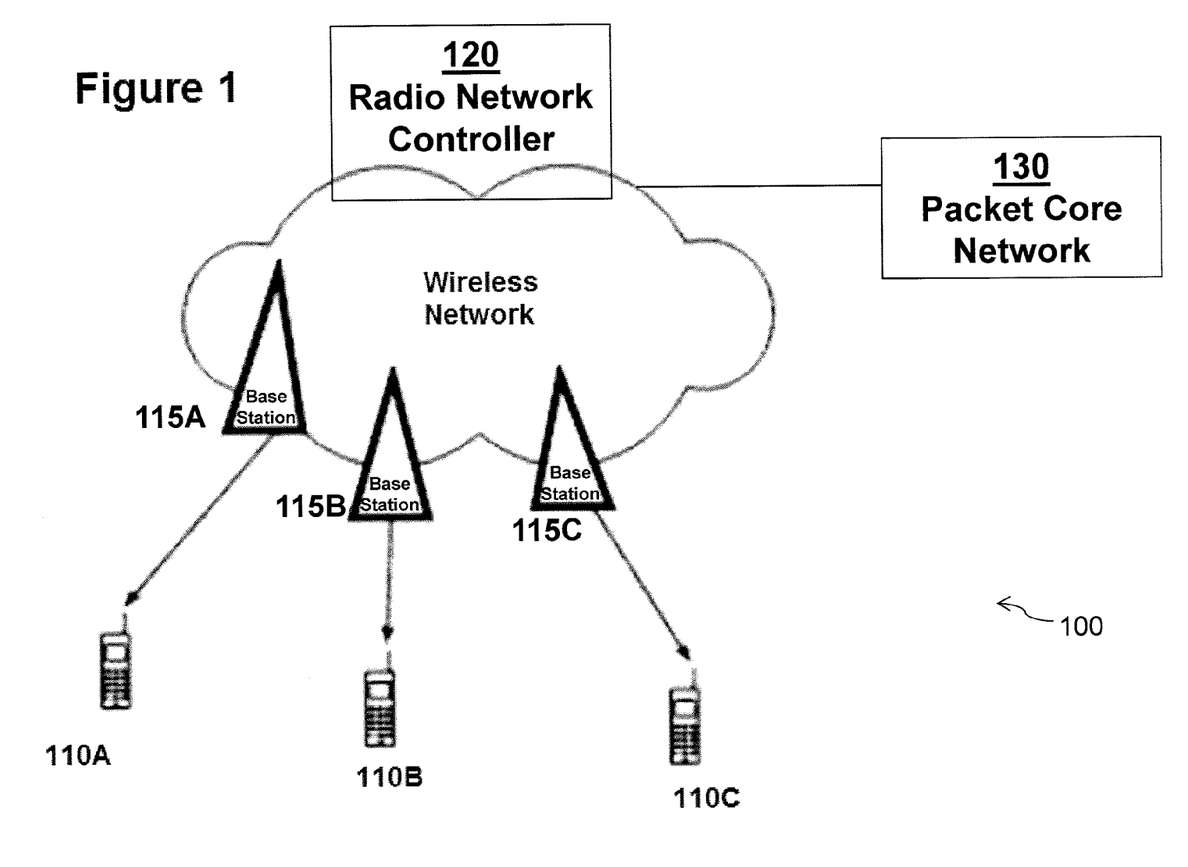
FIG. 1 is a block diagram illustrating an embodiment of a network.

FIG. 1 is a block diagram illustrating embodiments of a network 100 that includes one or more wireless devices 110, radio network nodes 115, radio network controller 120, and core network nodes 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. Example embodiments of wireless device 110, radio network node 115, and a network node (such as radio network controller 120 or core network node 130) are described with respect to FIGS. 5, 6, and 7, respectively.

Figure 2A:
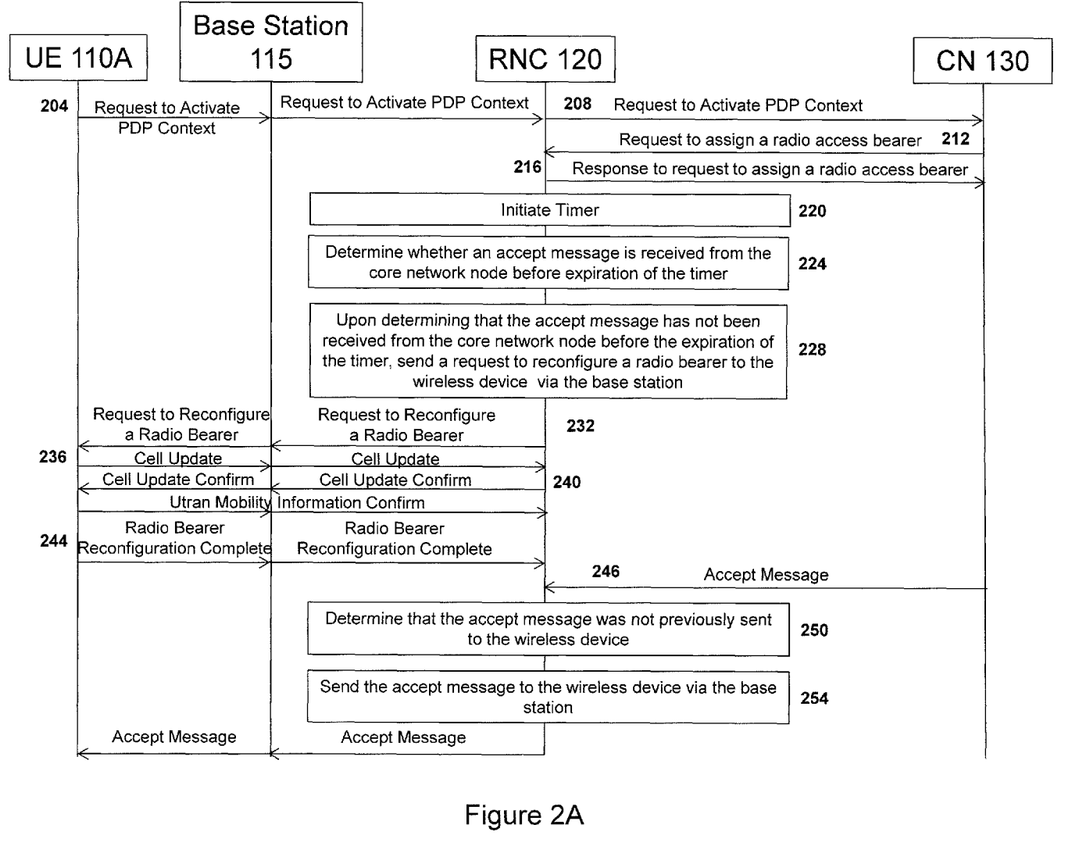
FIG. 2A is a signaling diagram illustrating an exchange of signals in certain embodiments of a network.

FIG. 2A is a signaling diagram illustrating an exchange of signals in certain embodiments of a network. In certain embodiments, network 100 may be a 2G, 3G, or WCDMA mobile network, or any other suitable network. In certain other embodiments, network 100 may be any other suitable mobile network or other network. In some embodiments, the signals may be exchanged among a wireless device 110 (such as UE), a radio access node 115 (such as a node of a base station system), a radio network controller 120, and a core network node 130 (such as an SGSN).

The call begins at step 204 where wireless device 110A, operating in the forward access channel state, sends a request to activate PDP context to radio network controller 120. In certain embodiments, the call may be a packet service call. In certain embodiments, and as illustrated in FIG. 2A, the request to activate PDP context may be sent to radio network controller 120 via base station 115. In certain embodiments, the request to activate PDP context may be sent after sending a security mode complete message:

At step 208, radio network controller 120 sends the received request to activate PDP context message to core network node 130. At step 212, core network node 130 may send a request to assign a radio access bearer to radio network controller 120 in response to receiving the request to activate PDP context. At step 216, radio network controller 120 may send a response to the request to assign a radio access bearer.

At step 220, a timer is initiated. In certain embodiments, the timer is initiated at radio network controller 120. In certain embodiments, the timer may be initiated after sending the response to the request to assign the radio access bearer (i.e., after step 216). In certain embodiments, the timer may be initiated immediately after or upon sending the response to the request to assign a radio access bearer. In certain embodiments, the timer may be user configurable. As an example, and not by way of limitation, the timer may be set a value less than or equal to 100 milliseconds, such 100 ms, 90 ms, 80 ms, 70 ms, 60 ms, 50 ms, or other suitable value. Depending on the particular application, the duration of the timer may be optimized to reduce PDP context activation latency. In certain embodiments, the duration of the timer may be dynamically adjusted.

At step 224, radio network controller 120 may determine whether an accept message is received from the core network node before expiration of the timer. In the embodiment illustrated in FIG. 2A, the accept message does not arrive before the expiration of the timer. At step 228, radio network controller 120 may determine that the accept message has not been received from core network node 130 before the expiration of the timer. At step 232, in response to the determination that the accept message has not been received, radio network controller 120 may send a request to reconfigure a radio bearer to wireless device 110. In certain embodiments, the request to reconfigure the radio bearer is sent to wireless device 110 via base station 115.

At step 236, receipt of the request to reconfigure a radio bearer at wireless device 110 results in initiation of a cell update procedure. In certain embodiments, the cell update procedure delays sending of the accept message from the radio network controller 120 to the wireless device 110. For example, for wireless devices 110 operating in state FACH, sending of the accept message may be delayed. In some embodiments, the timer may be configured to provide a wait period during which radio network controller 120 waits to receive the accept message from core network node 130. During the wait period, radio network controller 120 does not initiate the bearer reconfiguration, thus the cell update procedure is not yet triggered. If the accept message does not arrive during the wait period, the timer expires and radio network controller 120 proceeds with the bearer reconfiguration (which triggers the cell update procedure).

The timer may be optimized so that radio network controller 120 does not wait too long for the accept message. So, when there is a delay in receiving the accept message from core network node 130, radio network controller 120 can get started with the bearer reconfiguration. That way, when radio network controller 120 eventually receives the accept message from core network node 130, the cell update will be complete (or near complete) and radio network controller 120 can forward the accept message to wireless device 110 with no or minimal further delay.

In certain embodiments, initiation of the cell update procedure causes a cell update message to be sent from wireless device 110 to radio network controller 120 via base station 115. At step 240, radio network controller 120 may send a cell update confirm message to wireless device 110 via base station 115. At step 244, a radio bearer reconfiguration complete message may be sent from wireless device 110 to radio network controller 120.

At step 246, core network node 130 sends radio network controller 120 an accept message that corresponds to the request to activate PDP context of step 208. Although FIG. 2A illustrates the accept message being received after the radio bearer reconfiguration complete message is received, the present disclosure contemplates that the accept message may be received by radio network controller 120 before the radio bearer reconfiguration complete message. At step 250, radio network controller 120 may determine that the accept message was not previously sent to wireless device 110. At step 254, upon determining that the accept message has not been previously sent to wireless device 110, radio network controller 120 may send the accept message to the wireless device 110. In certain embodiments, radio network controller 120 may send the accept message to wireless device 110 via the base station 115.

In operation, PDP context activation latency may be improved by allowing a time period equal to the duration of the timer for the accept message to be received by the radio network controller 120 before sending the request to reconfigure a radio bearer to wireless device 110. Receipt of the accept message by the radio network controller 120 prior to sending the request to reconfigure a radio bearer to the wireless device 110 may advantageously eliminate delay caused by the cell update procedure that may be initiated upon receipt of the request to reconfigure a radio bearer by wireless device 110. As illustrated in FIG. 2A, in certain circumstances the accept message may not arrive before the timer expires. To prevent long delays in sending the request to reconfigure a radio bearer to wireless device 110, in certain embodiments radio network controller 120 may, when the timer expires, send the request to reconfigure a radio bearer to wireless device 110. In certain embodiments, such as where wireless device 110 is operating in the forward access channel state, this may trigger the initiation of the cell update procedure. Although this may result in a delay associated with the cell update procedure, further delay associated with waiting for the accept message to arrive at the radio network controller 120 is avoided, thereby potentially improving PDP context activation latency.

Figure 2B:
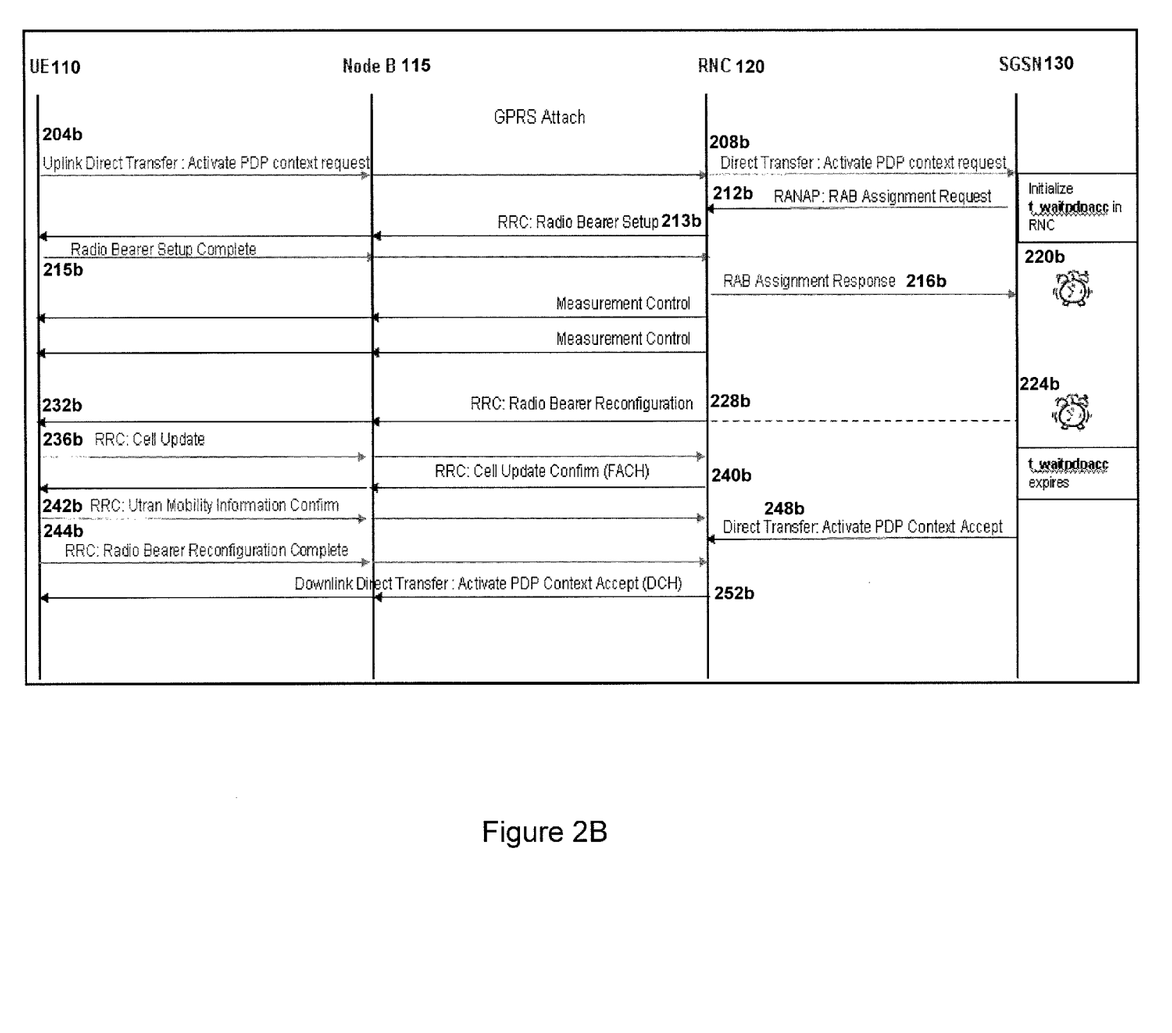
FIG. 2B is a call flow diagram illustrating an exchange of signals according to certain embodiments wherein the activate PDP context accept message is received at the radio network controller after the timer expires.

FIG. 2B is a call flow diagram illustrating an exchange of signals according to certain embodiments wherein the activate PDP context accept message is received at the radio network controller 120 after the timer expires. In some embodiments, the signals may be exchanged among a wireless device 110 (such as user equipment (UE)), a radio access node 115 (such as Node B), a radio network controller 120, and a core network node 130 (such as Serving GPRS Support Node (SGSN)).

The call begins at step 204b where user equipment 110, operating in the forward access channel state, sends an Activate PDP context request to radio network controller 120. In certain embodiments, the call may be a packet service call. As an example, and not by way of limitation, the Activate PDP context request may be sent via uplink direct transfer. User equipment 110 may send the Activate PDP context request to radio network controller 120 via Node B 115. In certain embodiments, the Activate PDP context request may be sent after sending an RRC: Security Mode Complete message.

At step 208b, radio network controller 120 may send the Activate PDP context request to SGSN 130. As an example, and not by way of limitation, the radio network controller 120 may send the Activate PDP context request to SGSN 130 via Direct Transfer.

At step 212b, SGSN 130 may send a RANAP: RAB Assignment request to radio network controller 120. At step 213b, radio network controller 120 may send an RRC: Radio Bearer Setup message to user equipment 110 via Node B 115. At step 215b, user equipment 110 may send a Radio Bearer Setup Complete message to radio network controller 120 via Node B 115. At step 216b, radio network controller 120 may send an RAB Assignment Response to SGSN 130.

At step 220b, a timer is initiated by the radio network controller. In certain embodiments, the timer is initiated after the RAB Assignment Response is sent. In certain embodiments, the timer may be initiated immediately after or upon sending the RAB Assignment Response. In certain embodiments, the timer may be user configurable. As an example, and not by way of limitation, the timer may be set less than or equal to 100 milliseconds. Depending on the particular application, the duration of the timer may be optimized to reduce PDP context activation latency. In certain embodiments, the duration of the timer may be dynamically adjusted.

Subsequent to step 220b, radio network controller 120 may determine whether an Activate PDP Context Accept message is received from the SGSN 130 before expiration of the timer. In the embodiment illustrated in FIG. 2B, the Activate PDP Context Accept message does not arrive before the expiration of the timer at step 224*b*. Thus, radio network controller 120 may determine that the Activate PDP Context Accept message has not been received from the SGSN 130 before the expiration of the timer at step 224*b*. At step 228*b*, in response to the determination that the Activate PDP Context Accept message has not been received, radio network controller 120 may send an RRC: Radio Bearer Reconfiguration message to user equipment 110. In certain embodiments, RRC: Radio Bearer Reconfiguration message is sent to user equipment 110 via Node B 115.

At step 232*b*, receipt of the RRC: Radio Bearer Reconfigure request at user equipment 110 results in initiation of a cell update procedure. In certain embodiments, the cell update procedure may begin at step 236*b* where user equipment 110 sends an RRC: Cell Update message to radio network controller 120 via Node B 115. At step 240*b*, radio network controller 120 may send an RRC: Cell Update Confirm (FACH) message to user equipment 110 via Node B 115. In certain embodiments, at step 242*b*, user equipment 110 may send an RRC: Utran Mobility Information Confirm message to radio network controller 120 via Node B 115. At step 244*b*, user equipment 110 may send an RRC: Radio Bearer Reconfiguration Complete message to radio network controller 120 via Node B 115.

At step 248*b*, an Activate PDP Context Accept message is received at radio network controller 120 from SGSN 130. In the embodiment illustrated in FIG. 2B, the Activate PDP Context Accept message arrives at radio network controller 120 before the RRC: Radio Bearer Reconfiguration Complete message. The present disclosure contemplates, however, that in certain other embodiments the RRC: Radio Bearer Reconfiguration Complete message may arrive before the Activate PDP Context Accept message. In certain embodiments, the Activate PDP Context Accept message is sent from SGSN 130 via direct transfer. Subsequently, radio network controller 120 may determine that the Activate PDP Context Accept message was not previously sent to user equipment 110. At step 252*b*, upon determining that the Activate PDP Context Accept message has not been previously sent to user equipment 110, radio network controller 120 may send an Activate PDP Context Accept (DCH) message to user equipment 110 via Node B 115. In certain embodiments, the Activate PDP Context Accept (DCH) message is sent via downlink direct transfer.

As noted above with respect to FIG. 2A, PDP context activation latency may be improved by allowing a time period equal to the duration of the timer for the accept message to be received by the radio network controller 120 before sending RRC: Radio Bearer Reconfiguration message to user equipment 110. As illustrated in FIG. 2B, the Activate PDP Context Accept message may not arrive at the radio network controller 120 before the timer expires. To prevent long delays in sending the RRC: Radio Bearer Reconfiguration message to user equipment 110, in certain embodiments the radio network controller 120 may, when the timer expires, send the RRC: Radio Bearer Reconfiguration message to user equipment 110. Although this may result in a delay associated with the cell update procedure, further delay associated with waiting for the accept message to arrive at the radio network controller 120 is avoided, thereby potentially improving PDP context activation latency.

Figure 3A:
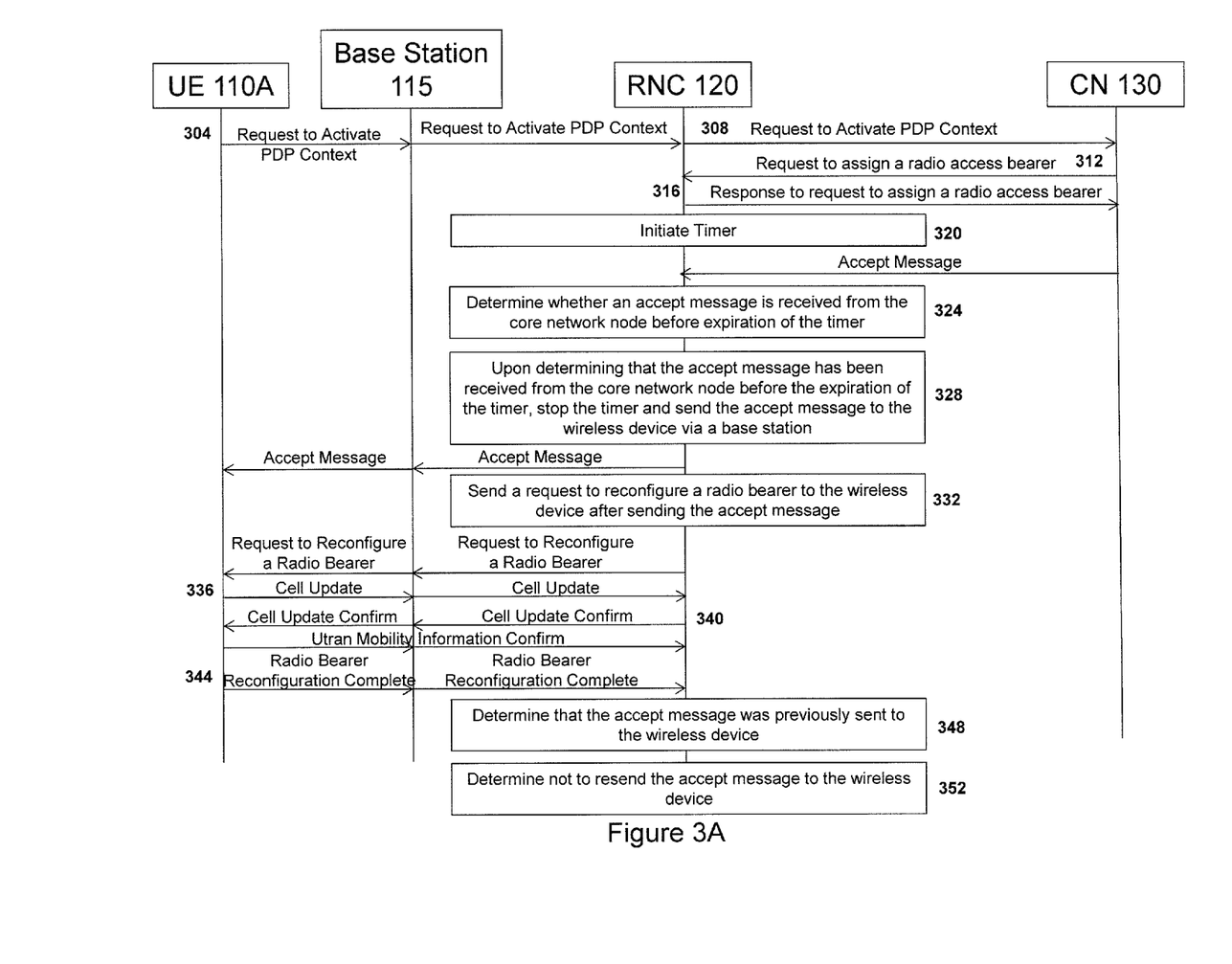
FIG. 3A is a signaling diagram illustrating an exchange of signals in certain embodiment of a network.

FIG. 3A is a signaling diagram illustrating an exchange of signals in certain embodiment of a network. In certain embodiments, network 100 may be a 2G, 3G, or WCDMA mobile network. In certain other embodiments, network 100 may be any other suitable mobile network or other network.

In some embodiments, the signals may be exchanged among a wireless device 110 (such as UE), a radio access node 115 (such as a node of a base station system), a radio network controller 120, and a core network node 130 (such as an SGSN).

The call may begin at Step 304 where wireless device 110A, operating in the forward access channel state, sends a request to activate PDP context to radio network controller 120. In certain embodiments, the call may be a packet service call. In certain embodiments, the request to activate PDP context may be sent to radio network controller 120 via base station 115. In certain embodiments, the request to activate PDP context may be sent after sending a security mode complete message.

At step 308, radio network controller 120 sends the received request to activate PDP context message to core network node 130. At step 312, core network node 130 may send a request to assign a radio access bearer to radio network controller 120 in response to receiving the request to activate PDP context. At step 316, radio network controller 120 may send a response to the request to assign the radio access bearer.

At step 320, a timer is initiated. In certain embodiments, the timer is initiated at radio network controller 120. In certain embodiments, the timer may be initiated after sending the response to request to assign a radio access bearer. In certain embodiments, the timer may be initiated immediately after or upon sending the response to the request to assign a radio access bearer. In certain embodiments, the timer may be user configurable. As an example, and not by way of limitation, the timer may be set less than or equal to 100 milliseconds. Depending on the particular application, the duration of the timer may be optimized to reduce PDP context activation latency. In certain embodiments, the duration of the timer may be dynamically adjusted.

At step 324, radio network controller 120 may determine whether an accept message is received from the core network node before expiration of the timer. In the embodiment illustrated in FIG. 3A, the accept message arrives at radio network controller 120 before the expiration of the timer. At step 324, radio network controller 120 may determine that the accept message has been received from core network node 130 before the expiration of the timer. At step 328, in response to the determination that the accept message has been received, radio network controller 120 may stop the timer and send the accept message to the wireless device 110 via base station 115. In certain embodiments, the timer may be cleared. At step 332, after sending the accept message to the wireless device 110, radio network controller 120 may send a request to reconfigure a radio bearer to the wireless device 110. In certain embodiments, the request to reconfigure a radio bearer is sent to the wireless device 110 via base station 115.

At step 336, receipt of the request to reconfigure a radio bearer at wireless device 110 results in initiation of a cell update procedure. In certain embodiments, initiation of the cell update procedure causes a cell update message to be sent from the wireless device 110 to radio network controller 120 via base station 115. At step 340, radio network controller 120 may send a cell update confirm message to wireless device 110 via base station 115. At step 344, a radio bearer reconfiguration complete message may be sent from wireless device 110 to radio network controller 120.

At step 348, radio network controller 120 may determine that the accept message was previously sent to wireless device 110. At step 352, upon determining that the accept message was previously sent to wireless device 110, radio network controller 120 may determine not to resend the accept message to wireless device 110.

In operation, PDP context activation latency may be improved by allowing a time period equal to the duration of the timer for the accept message to be received by the radio network controller 120 before sending the request to reconfigure a radio bearer to wireless device 110. Receipt of the accept message by the radio network controller 120 prior to sending the request to reconfigure a radio bearer to wireless device 110 may advantageously eliminate delay caused by the cell update procedure that may be initiated upon receipt of the request to reconfigure a radio bearer by wireless device 110. As illustrated in FIG. 3A, the accept message may arrive before the timer expires. To expedite sending of the accept message and reduce the overall PDP context activation time, when the accept message is received at radio network controller 120 before the timer expires, the timer is stopped and the accept message is sent to wireless device 110. Such an embodiment advantageously allows for sending the accept message before the request to reconfigure a radio bearer, thereby avoiding the delay associated with the cell update procedure that occurs when the wireless device is operating in the forward access channel state. Thus, overall PDP Context Activation time may be advantageously reduced. Additionally, by stopping the timer upon receiving the accept message, additional delay that may result from waiting for the timer to expire is avoided, thereby further improving PDP context activation latency.

Figure 3B:
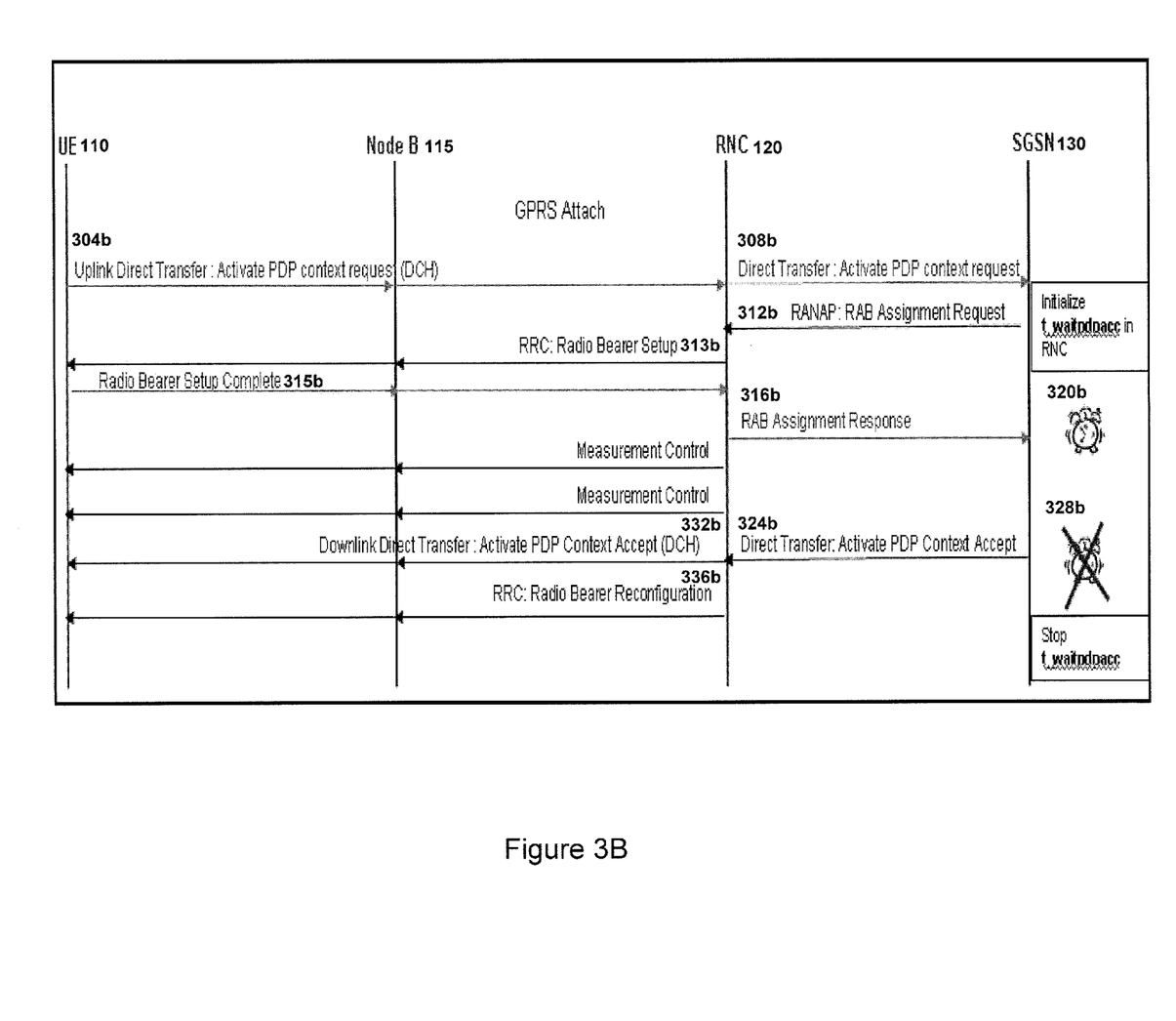
FIG. 3B is a call flow diagram according to certain embodiments wherein the activate PDP context accept message is received at the radio network controller before the timer expires.

FIG. 3B is a call flow diagram according to certain embodiments wherein the activate PDP context accept message is received at the radio network controller 120 before the timer expires. In some embodiments, the signals may be exchanged among a wireless device 110 (such as user equipment (UE)), a radio access node 115 (such as Node B), a radio network controller 120, and a core network node 130 (such as Serving GPRS Support Node (SGSN)).

The call begins at step 304b where user equipment 110, operating in the forward access channel state, sends an Activate PDP context request to radio network controller 120. In certain embodiments, the call may be a packet service call. As an example, and not by way of limitation, the Activate PDP context request may be sent via uplink direct transfer. User equipment 110 may send the Activate PDP context request to radio network controller 120 via Node B 115. In certain embodiments, the Activate PDP context request may be sent after sending an RRC: Security Mode Complete message.

At step 308b, radio network controller 120 may send the Activate PDP context request to SGSN 130. As an example, and not by way of limitation, the radio network controller 120 may send the Activate PDP context request to SGSN 130 via Direct Transfer.

At step 312b, SGSN 130 may send a RANAP: RAB Assignment request to radio network controller 120. At step 313b, radio network controller 120 may send an RRC: Radio Bearer Setup message to user equipment 110 via Node B 115. At step 315b, user equipment 110 may send a Radio Bearer Setup Complete message to radio network controller 120 via Node B 115. At step 316b, radio network controller 120 may send an RAB Assignment Response to SGSN 130.

At step 320b, a timer is initiated by the radio network controller. In certain embodiments, the timer is initiated after the RAB Assignment Response is sent. In certain embodiments, the timer may be initiated immediately after or upon sending the RAB Assignment Response. In certain embodiments, the timer may be user configurable. As an example, and not by way of limitation, the timer may be set less than or equal to 100 milliseconds. Depending on the particular application, the duration of the timer may be optimized to reduce PDP context activation latency. In certain embodiments, the duration of the timer may be dynamically adjusted.

Subsequent to step 320b, radio network controller 120 may determine whether an Activate PDP Context Accept message is received from the SGSN 130 before expiration of the timer. In the embodiment illustrated in FIG. 3B, the Activate PDP Context Accept message arrives before the expiration of the timer at step 324b. Radio network controller 120 may determine that the Activate PDP Context Accept message has been received from the SGSN 130 before the expiration of the timer. At step 328b, in response to the determination that the Activate PDP Context Accept message has been received, radio network controller 120 may stop the timer, and at step 332b send the accept message to the wireless device 110 via base station 115. In certain embodiments, the timer may be cleared.

At step 336b, after sending the accept message to wireless device 110, radio network controller 120 may send an RRC: Radio Bearer Reconfiguration message to wireless device 110. In certain embodiments, the RRC: Radio Bearer Reconfiguration message is sent to wireless device 110 via base station 115. Although not shown in FIG. 3B, receipt of the RRC: Radio Bearer Reconfiguration message at wireless device 110 operating in the forward access channel state may result in initiation of a cell update procedure.

Subsequent to step 336b, radio network controller 120 may determine that the Activate PDP Context Accept message was previously sent to wireless device 110. Upon determining that the Activate PDP Context Accept message was previously sent to wireless device 110, radio network controller 120 may determine not to resend the accept message to wireless device 110.

Figure 4:
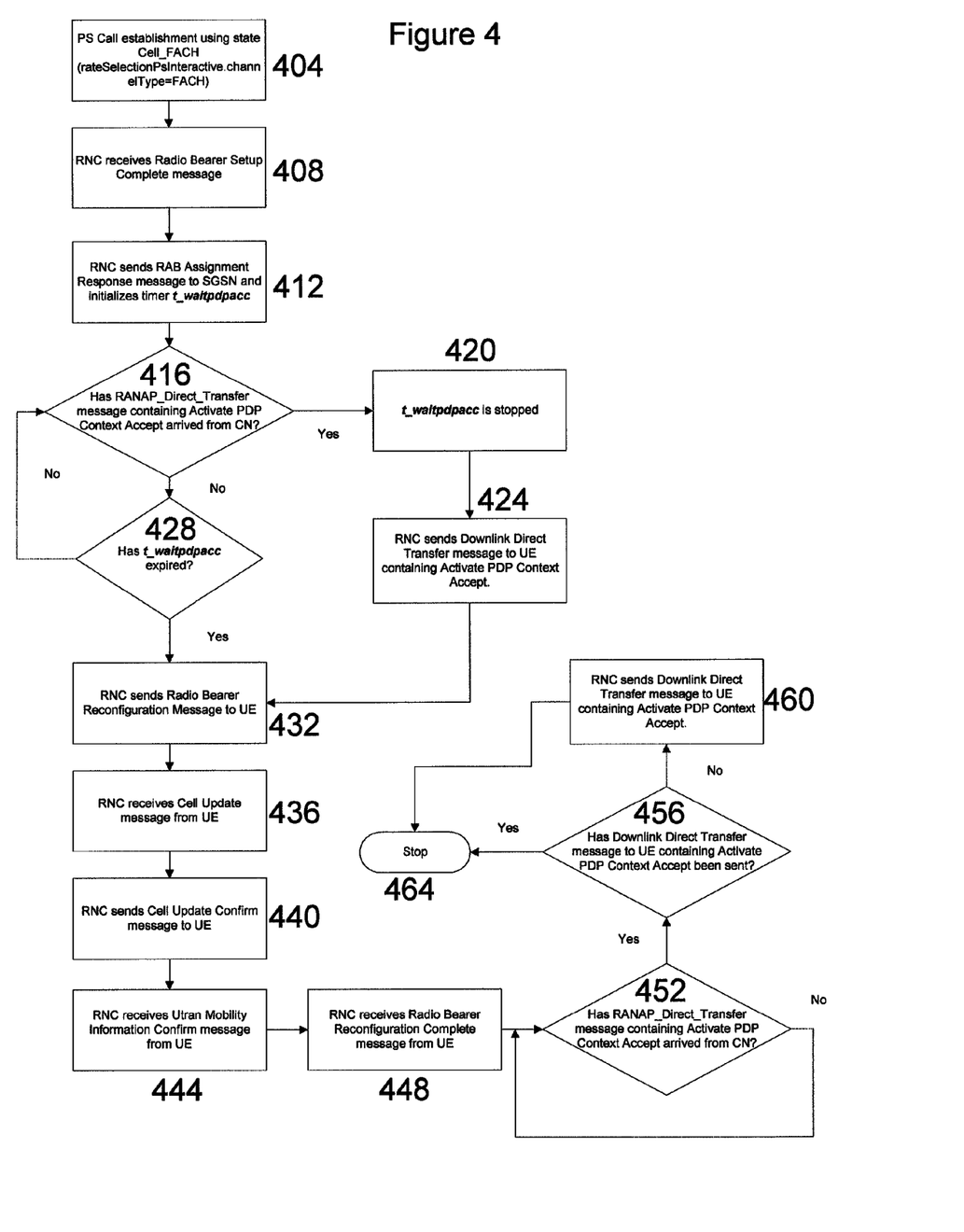
FIG. 4 is a flow chart depicting an algorithm according to certain embodiments.

FIG. 4 is a flow chart depicting an algorithm according to certain embodiments. At step 404, a packet service call is established in the forward access channel state. At step 408, radio network controller 120 receives a Radio Bearer Setup Complete message. At step 412, radio network controller 120 sends a RAB Assignment response message to SGSN 130 and initiates the timer. At decision point 416, radio network controller 120 determines whether the Activate PDP Context Accept message has arrived from the core network node 130 (e.g. SGSN).

If the Activate PDP Context Accept message has arrived at radio network controller 120, then the algorithm proceeds to step 420, and the timer is stopped. Next, at step 424, radio network controller 120 sends the Activate PDP Context Accept message to user equipment 110. In certain embodiments, the Activate PDP Context Accept message is sent via downlink direct transfer. After sending the Activate PDP Context Accept message to user equipment 110, the algorithm proceeds to step 432.

If at step 416 the Activate PDP Context Accept message has not arrived at radio network controller 120, then the algorithm proceeds to decision point 428. At decision point 428, the radio network controller determines whether the timer has expired. If the timer has not expired, then the algorithm returns to step 416 and proceeds as discussed above. If the timer has expired, the algorithm proceeds to step 432.

At step 432, radio network controller 120 sends a Radio Bearer Reconfiguration Message to user equipment 110. At step 436, radio network controller 120 receives a Cell Update message from user equipment 110. At step 440, radio network controller 120 sends a Cell Update Confirm message to user equipment 110. At step 444, radio network controller 120 may receive a Utran Mobility Information Confirm message from user equipment 110. At step 448, radio network controller 120 receives a Radio Bearer Reconfiguration Complete message from user equipment 110.

With the Radio Bearer Reconfiguration Complete message received at radio network controller 120, the algorithm proceeds to decision point 452. At decision point 452, radio network controller 120 determines whether the Activate PDP Context Accept message has arrived from the core network node. If the Activate PDP Context Accept message has not arrived at radio network controller 120, the algorithm repeats the inquiry of decision point 452. If the Activate PDP Context Accept message has arrived, then the algorithm proceeds to decision point 456.

At decision point 456, radio network controller 120 determines whether the Activate PDP Context Accept message has been sent to user equipment 110. If the Activate PDP Context Accept message has been sent to user equipment 110 (e.g., step 424), the algorithm proceeds to step 464 and stops. If the Activate PDP Context Accept message has not been sent to user equipment 110, radio network controller 120 sends the Activate PDP Context Accept message to user equipment 110 at step 460. In certain embodiments, the Activate PDP Context Accept message is sent via a Downlink Direct Transfer message. After sending the Activate PDP Context Accept message to user equipment 110, the algorithm proceeds to step 464 and stops.

As described with respect to FIG. 1 above, embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone).

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as WCDMA. However, the scope of the disclosure is not limited to the examples and other embodiments could use different radio access technologies. Each of wireless device 110, radio network node 115, radio network controller 120, and core network node 130 may include any suitable combination of hardware and/or software. Examples of particular embodiments of wireless device 110, radio network node 115, and network nodes (such as radio network controller 120 or core network node 130) are described with respect to FIGS. 5, 6, and 7 below, respectively.

Figure 5:
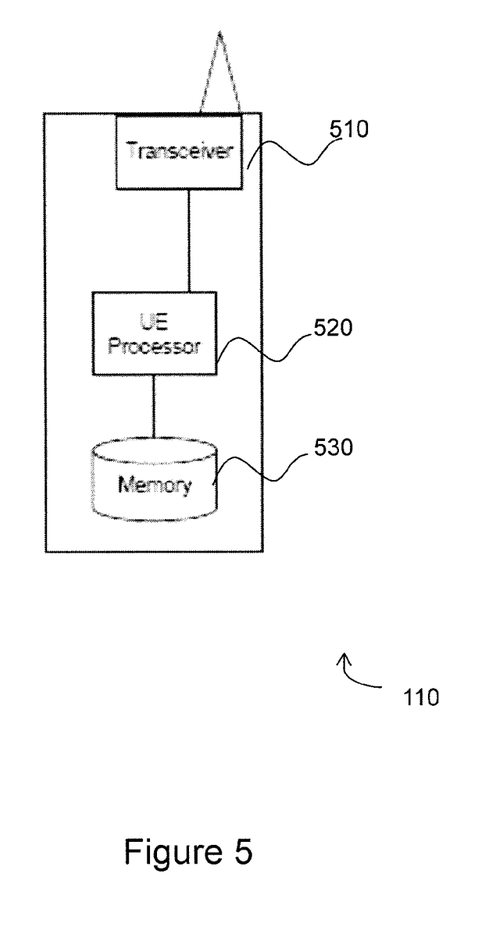
FIG. 5 is a block diagram illustrating certain embodiments of a wireless device.

FIG. 5 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 510, processor 520, and memory 530. In some embodiments, transceiver 510 facilitates transmitting wireless signals to and receiving wireless signals from radio network node 120 (e.g., via an antenna), processor 520 executes instructions to provide some or all of the functionality described above as being provided by wireless device 110, and memory 530 stores the instructions executed by processor 520.

Processor 520 may include any suitable combination of hardware and software implemented in one or more modules to execute instructions and manipulate data to perform some or all of the described functions of wireless device 110. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above).

Figure 6:
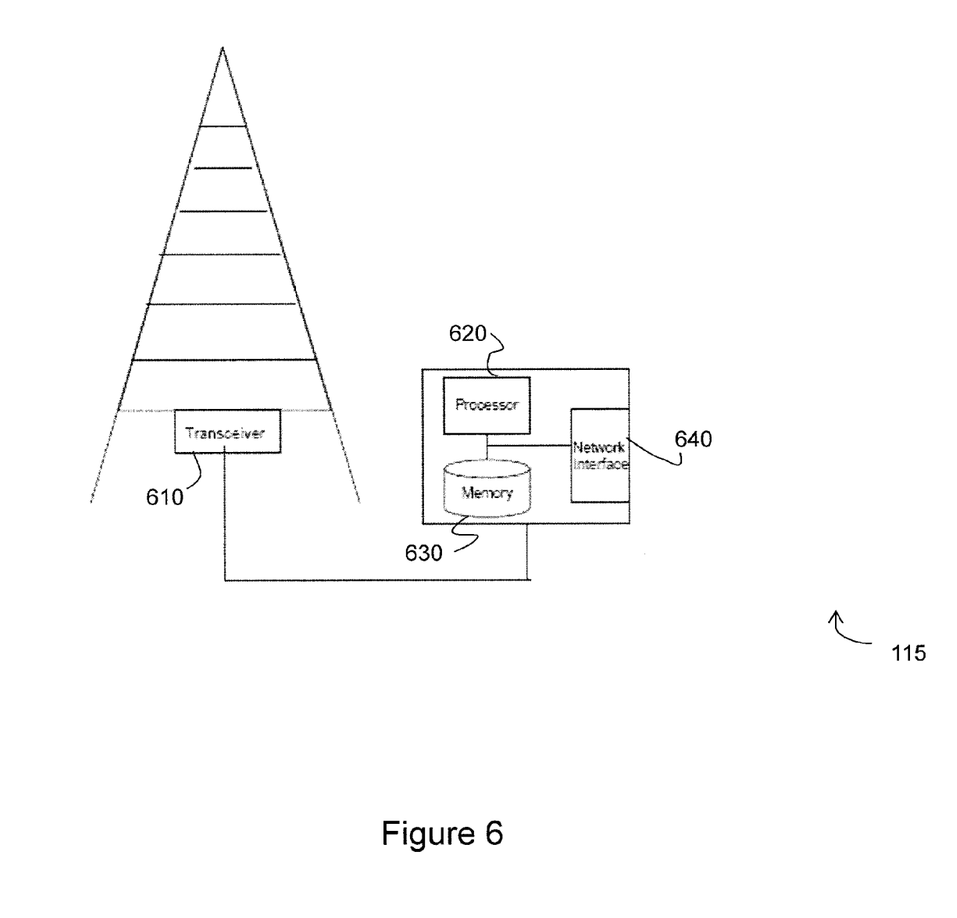
FIG. 6 is a block diagram illustrating certain embodiments of a radio network node.

FIG. 6 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogeneous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 610, processor 620, memory 630, and network interface 640. In some embodiments, transceiver 610 facilitates transmitting wireless signals to and receiving wireless signals from wireless device 110 (e.g., via an antenna), processor 620 executes instructions to provide some or all of the functionality described above as being provided by a radio network node 115, memory 630 stores the instructions executed by processor 620, and network interface 640 communicates signals to backend network components, such as a gateway, switch, router, Internet, Public Switched Telephone Network (PSTN), core network nodes 130, radio network controllers 120, etc.

Processor 620 may include any suitable combination of hardware and software implemented in one or more modules to execute instructions and manipulate data to perform some or all of the described functions of radio network node 115. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for radio network node 115, send output from radio network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of radio network node 115 may include additional components beyond those shown in FIG. 6 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 7:
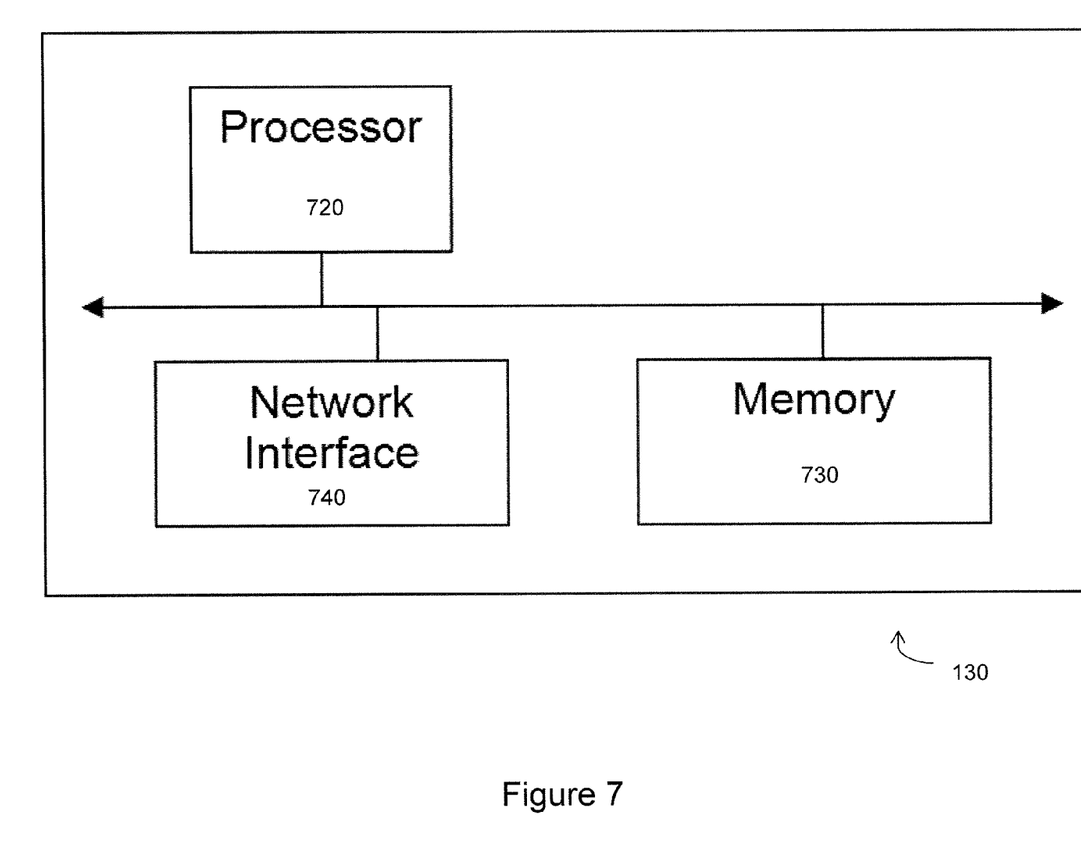
FIG. 7 is a block diagram illustrating certain embodiments of a core network node.

FIG. 7 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 720, memory 730, and network interface 740. In some embodiments, processor 720 executes instructions to provide some or all of the functionality described above as being provided by the network node, memory 730 stores the instructions executed by processor 720, and network interface 740 communicates signals to an suitable node, such as a gateway, switch, router, Internet, Public Switched Telephone Network (PSTN), radio network nodes 115, radio network controllers 120, core network nodes 130, etc.

Processor 720 may include any suitable combination of hardware and software implemented in one or more modules to execute instructions and manipulate data to perform some or all of the described functions of the network node. In some embodiments, processor 620 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the network node's functionality, including any of the functionality described above and/or any additional functionality (including any functionality necessary to support the solution described above).

Some embodiments of the disclosure may provide one or more technical advantages. As an example, in some embodiments, implementing a timer may improve PDP Context Activation time in cases where initial packet service call establishment takes place in the forward access channel state. Because PDP Context Activation Time carries significant weight under Drive Test Key Performance Indicators, any improvement in PDP Context Activation time will advantageously increase scores under that benchmarking system. Furthermore, because customers may have strict thresholds for PDP Context Activation Time, implementation of the proposed embodiments may assist in meeting these requirements where initial packet service call setup happens on the forward access channel state.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
UL: Uplink
DL: Down Link
RRC: Radio Resource Control
NEAP: NodeB Application Protocol
RANAP: Radio Access Network Application Protocol
UE: User Equipment
RNC: Radio Network Controller
CN: Core Network
MSC: Mobile switching center
SGSN: Serving GPRS Support Node
PS: Packet Service
PDP: Packet Data Protocol
FACH: Forward Access Channel
RAB: Radio Access Bearer
RNC: Radio Network Controller
DCH: Dedicated Channel

The invention claimed is:

1. A radio network controller, comprising:
one or more processors; and
a non-transitory computer-readable storage medium further including computer-readable instructions that, when executed by the one or more processors, are configured to:
 receive a request to activate a packet data protocol (PDP) context for a wireless device operating in a forward access channel state;
 send the request to activate the PDP context to a core network node;
 receive a request to assign a radio access bearer from the core network node;
 send the request to assign the radio access bearer to the wireless device via the base station;
 receive a response to the request to assign the radio access bearer from the wireless device via the base station;
 send the response to the request to assign the radio access bearer to the core network node;
 initiate a timer after sending the response to the request to assign the radio access bearer to the core network node;
 determine whether an accept message is received from the core network node before expiration of the timer, the accept message corresponding to the request to activate the PDP context;
 upon determining that the accept message has not been received from the core network node before the expiration of the timer, send the wireless device a request to reconfigure the radio bearer, the request to reconfigure the radio bearer sent to the wireless device via a base station.

2. The radio network controller of claim 1, wherein a cell update procedure is initiated upon receipt of the request to reconfigure the radio bearer by the wireless device.

3. The radio network controller of claim 1, wherein the timer is user configurable.

4. The radio network controller of claim 1, wherein a duration of the timer is set less than or equal to 100 milliseconds.

5. The radio network controller of claim 1, further operable to:
 receive a radio bearer reconfiguration complete message from the wireless device;
 receive the accept message from the core network node;
 determine that the accept message was not previously sent to the wireless device; and
 send the accept message to the wireless device via the base station.

6. A method for improving packet data protocol (PDP) context activation latency in a radio network controller, comprising:
 receiving a request to activate a PDP context for a wireless device operating in a forward access channel state;
 sending the request to activate the PDP context to a core network node;
 receiving a request to assign a radio access bearer from the core network node;
 sending the request to assign the radio access bearer to the wireless device via the base station;
 receiving a response to the request to assign the radio access bearer from the wireless device via the base station;
 sending the response to the request to assign the radio access bearer to the core network node;
 initiating a timer after sending the response to the request to assign the radio access bearer to the core network node;
 determining whether an accept message is received from the core network node before expiration of the timer, the accept message corresponding to the request to activate the PDP context; and
 upon determining that the accept message has not been received from the core network node before the expiration of the timer, sending the wireless device a request to reconfigure a radio bearer, the request to reconfigure the radio bearer sent to the wireless device via a base station.

7. The method node of claim 6, wherein a cell update procedure is initiated upon receipt of the request to reconfigure the radio bearer by the wireless device.

8. The method of claim 6, wherein the timer is user configurable.

9. The method of claim 6, wherein a duration of the timer is set less than or equal to 100 milliseconds.

10. The method of claim 6, further comprising:
 receiving a radio bearer reconfiguration complete message from the wireless device;
 receiving the accept message from the core network node;
 determining that the accept message was not previously sent to the wireless device; and
 sending the accept message to the wireless device via the base station.

11. A radio network controller, comprising:
one or more processors; and
a non-transitory computer-readable storage medium further including computer-readable instructions that, when executed by the one or more processors, are configured to:
 receive a request to activate a packet data protocol (PDP) context for a wireless device operating in a forward access channel state;
 send the request to activate the PDP context to a core network node;
 receive a request to assign a radio access bearer from the core network node;
 send the request to assign the radio access bearer to the wireless device via the base station;
 receive a response to the request to assign the radio access bearer from the wireless device via the base station;
 send the response to the request to assign the radio access bearer to the core network node;

initiate a timer after sending the response to the request to assign the radio access bearer to the core network node;

determine whether an accept message is received from the core network node before expiration of the timer, the accept message corresponding to the request to activate the PDP context;

upon determining that the accept message has been received from the core network node before the expiration of the timer, stop the timer and send the accept message to the wireless device via a base station; and send the wireless device a request to reconfigure a radio bearer, the request to reconfigure the radio bearer sent via the base station after sending the accept message.

12. The radio network controller of claim 11, wherein a cell update procedure is initiated upon receipt of the request to reconfigure the radio bearer by the wireless device.

13. The radio network controller of claim 11, wherein the timer is user configurable.

14. The radio network controller of claim 11, wherein a duration of the timer is set less than or equal to 100 milliseconds.

15. The radio network controller of claim 11, further operable to:

receive a radio bearer reconfiguration complete message from the wireless device;

determine that the accept message was previously sent to the wireless device; and determine not to resend the accept message to the wireless device.

16. A method for improving packet data protocol (PDP) context activation latency in a radio network controller, comprising receiving a request to activate a PDP context for a wireless device operating in a forward access channel state;

sending the request to activate the PDP context to a core network node;

receiving a request to assign a radio access bearer from the core network node;

sending the request to assign the radio access bearer to the wireless device via the base station;

receiving a response to the request to assign the radio access bearer from the wireless device via the base station;

sending the response to the request to assign the radio access bearer to the core network node;

initiating a timer after sending the response to the request to assign the radio access bearer to the core network node;

determining whether an accept message is received from the core network node before expiration of the timer, the accept message corresponding to the request to activate the PDP context;

upon determining that the accept message has been received from the core network node before the expiration of the timer, stopping the timer and sending the accept message to the wireless device via a base station; and sending the wireless device a request to reconfigure a radio bearer, the request to reconfigure the radio bearer sent via the base station after sending the accept message.

17. The method of claim 16, wherein a cell update procedure is initiated upon receipt of the request to reconfigure the radio bearer by the wireless device.

18. The method of claim 16, wherein the timer is user configurable.

19. The method of claim 16, wherein a duration of the timer is set less than or equal to 100 milliseconds.

20. The method of claim 16, further comprising:

receiving a radio bearer reconfiguration complete message from the wireless device;

determining that the accept message was previously sent to the wireless device; and determining not to resend the accept message to the wireless device.

* * * * *

UNITED STATES PATENT AND TRADEMARK OFFICE
CERTIFICATE OF CORRECTION

PATENT NO.         : 9,320,064 B2
APPLICATION NO.    : 14/224890
DATED              : April 19, 2016
INVENTOR(S)        : Sarkar et al.

It is certified that error appears in the above-identified patent and that said Letters Patent is hereby corrected as shown below:

In Column 15, Line 8, delete "NEAP:" and insert -- NBAP: --, therefor.

In Column 15, Line 9, delete "Protocol" and insert -- Part --, therefor.

In Column 15, Line 19, delete "RNC: Radio Network Controller".

In Column 16, Line 33, in Claim 7, delete "method node" and insert -- method --, therefor.

In Column 17, Lines 33-34, in Claim 16, delete "comprising" and insert -- comprising: --, therefor.

Signed and Sealed this
Twenty-eighth Day of June, 2016

Michelle K. Lee
*Director of the United States Patent and Trademark Office*